Feb. 12, 1957
B. L. SMITH
2,781,222
SLIP SOCKET RELEASER
Filed April 18, 1955
2 Sheets-Sheet 1
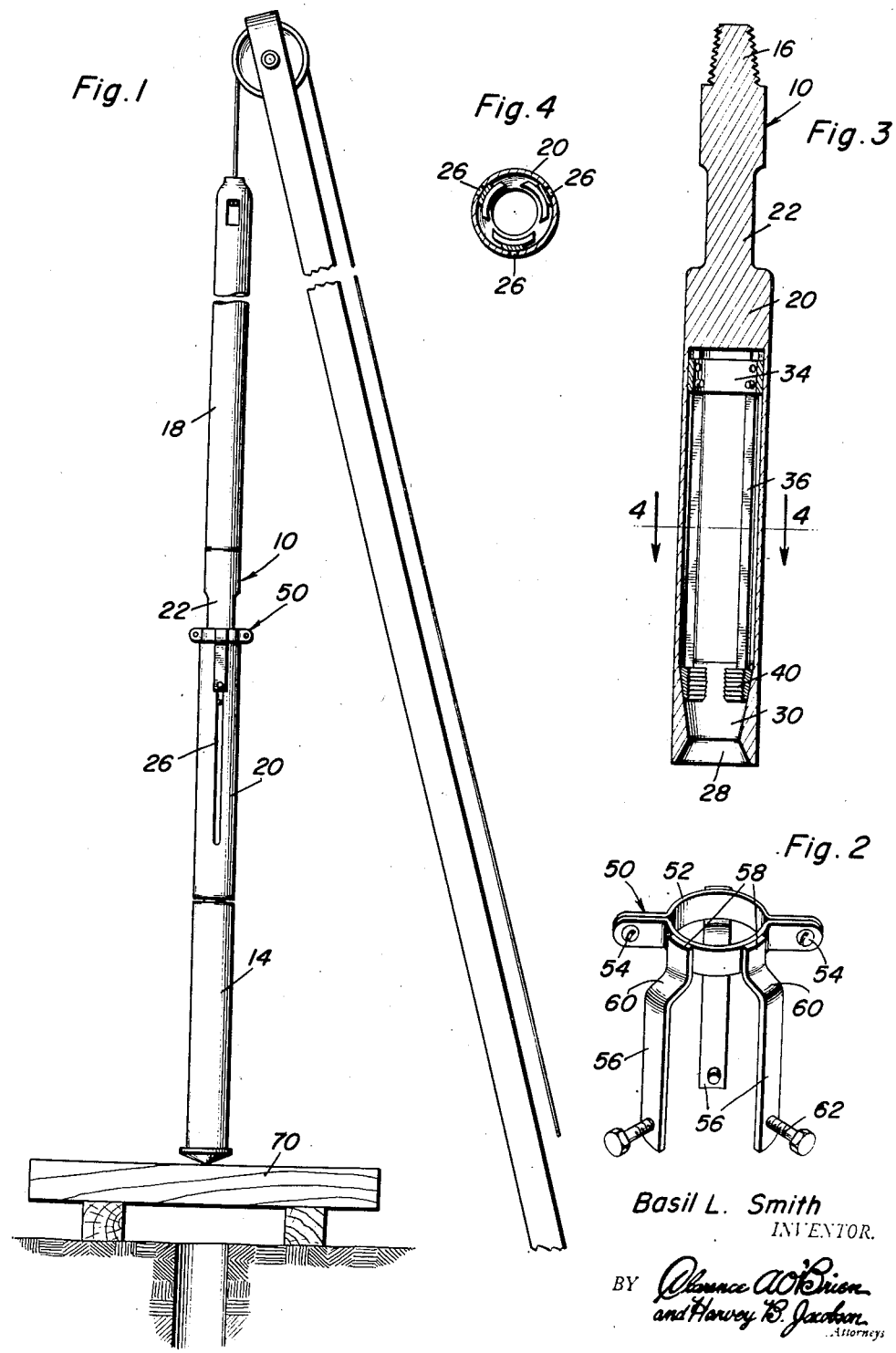
Basil L. Smith
INVENTOR.
BY *Clarence A. O'Brien*
*and Harvey B. Jackson*
Attorneys Feb. 12, 1957

B. L. SMITH 2,781,222

SLIP SOCKET RELEASER

Filed April 18, 1955

Basil L. Smith
INVENTOR.

BY *Clarence A. O'Brien*
*and Harvey B. Jackson*
Attorneys

United States Patent Office 2,781,222
Patented Feb. 12, 1957

2,781,222

SLIP SOCKET RELEASER

Basil L. Smith, Orrington, Maine

Application April 18, 1955, Serial No. 501,911

6 Claims. (Cl. 294—102)

This invention comprises novel and useful improvements in a slip socket releaser, and more specifically relates to an attachment for use with a fishing tool to facilitate the disengagement of the tool from the fish after the latter has been withdrawn from a well bore.

The primary purpose of this invention is to provide an attachment which may be employed with certain conventional types of fishing tools of the slip socket type and which will hold the slip socket in its fish releasing position in order to facilitate the disengagement from the tool of a fish recovered from a well bore.

A further object of the invention is to provide a slip socket releasing attachment in conformance with the preceding object which shall be of extremely simple and inexpensive construction, may be easily applied and shall be highly effective for the purpose intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view showing the manner in which the slip socket releasing device of this invention is employed in releasing a fishing tool from a fish withdrawn from a well bore;

Figure 2 is a perspective view of the slip socket releaser in accordance with this invention;

Figure 3 is a vertical sectional view through the fishing tool with which the present invention is to be employed;

Figure 4 is a horizontal sectional view taken substantially upon the plane indicated by the section line 4—4 of Figure 3;

When a drill stem or other well operating tool is broken in a well bore, the part of the article remaining in the well bore is known as a fish, and its recovery is necessitated before drilling operations or other well bore treating operations may be resumed. A number of fishing tools have been provided and are now upon the market designed for the recovery of a fish. Among these various fishing tools are certain types known as slip socket tools, and which have a slidable inner jaw which wedgingly embraces and clamps to the fish for withdrawing the same from the well bore. Frequently, however, it is difficult to release the fish from such tools after the fish has been withdrawn from the well bore. The primary purpose of the present invention is to provide an attachment which may be readily attached to such tools for facilitating the releasing engagement of the slip socket of the tool from the fish whereby the fish may be readily removed.

Figure 5:
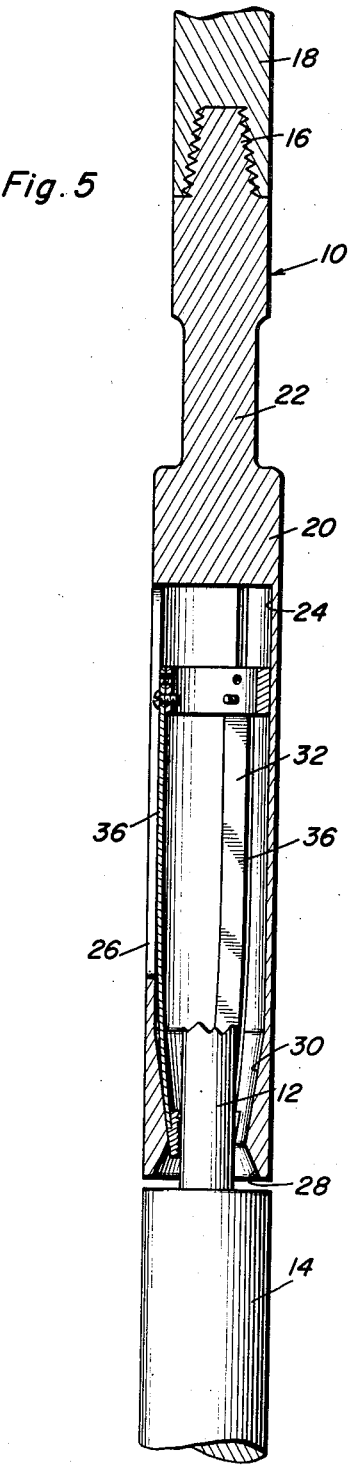
Figure 5 is a vertical sectional view through the fishing tool of Figure 3 and showing the manner in which the slip socket of the same is clampingly engaged upon a fish.

Reference is made first more specifically to Figure 5, wherein the numeral 10 designates generally a conventional form of slip socket fishing tool which, as shown in Figure 5, has clampingly engaged the stem portion 12 of a fish 14 in accordance with a well known manner. The fishing tool 10 is provided with an externally threaded pin 16 which is seated in the box portion of a stem 18 whereby the fishing tool is lowered into the well for engaging the fish and may be withdrawn from the well for pulling the fish therefrom.

In the conventional type of fishing tool illustrated, it will be seen that the tool includes a lower body portion 20 and a diametrically reduced midportion 22 lying between the body portion and the pin 16. The body 20 comprises a hollow cylinder open at its lower end to provide a cylindrical chamber 24 having a plurality of longitudinal vertical slots 26 therein, as will be best apparent from Figure 4, three such slots being a conventional construction.

At its lower end, the hollow body of the tool is provided with a downwardly flaring cone-shaped guiding surface 28 and above this surface lies a conical downwardly converging wedging surface 30.

The guide surface 28 serves to facilitate the passage of the stem or neck portion 12 of the fish 14 into the chamber 24 of the fishing tool body in order that the fish may be clamped and retained therein as set forth hereinafter.

Slidable in the chamber 24 is a slip socket member indicated generally by the numeral 32 and by means of which the stem 12 of the fish is automatically gripped and engaged by the fishing tool. This slip socket consists of an upper ring or band 34 which is of such size as to be freely slidable within the chamber 24, a plurality of resilient fingers 36 being secured to the upper ring, as by fasteners 38, and depending therefrom. At their lower ends, the fingers have secured thereto radially inwardly extending toothed jaws 40 having wedge-shaped surfaces 42 coacting with the wedging surface 30 previously mentioned. The inherent resiliency of the fingers 36 is such as to maintain the jaws 40 radially outwardly from each other in an open position. As the slip socket moves downwardly, the coacting engagement of the wedging surfaces 30 and 42 serve to yieldingly force the jaws inwardly towards each other whereby they will clamp upon the stem of the fishing tool 12. In Figure 3 is shown the slip socket in its raised position, ready for operation, the natural resiliency of the fingers being such as to retain the slip socket in this position. After the tool has been lowered into a well, and the stem 12 of the fish has been guided into the socket, upward movement of the stem 18 lifts the fishing tool 10, and engagement of the toothed jaws 40 causes the socket to cling to the stem of the fish, and the socket then moves downwardly in the chamber 24. This downward movement causes the above mentioned wedging action, and the jaws thus will firmly grip the fish by its stem and enable the withdrawal of the fish from the well bore.

As so far described, the construction and functioning of the fishing tool is conventional, and it is to a tool of such construction that the slip socket releasing device of this invention is particularly applicable.

The slip socket releasing attachment of this invention, indicated generally by the numeral 50, includes a split clamp 52 whose two halves are detachably secured together, as by fastenings 54. The clamp 50 is adapted to loosely encircle the reduced stem portion 22 of the fishing tool, but to be securely and rigidly clamped thereto when the fasteners 54 are tightened. Depending from the arcuate central portion of the clamp are a plurality of fingers 56, there being preferably provided as many fingers as there are slots 26 in the fishing tool body, it being also observed that the slip socket also has the same number of resilient fingers 36 as there are slots.

Figure 6:
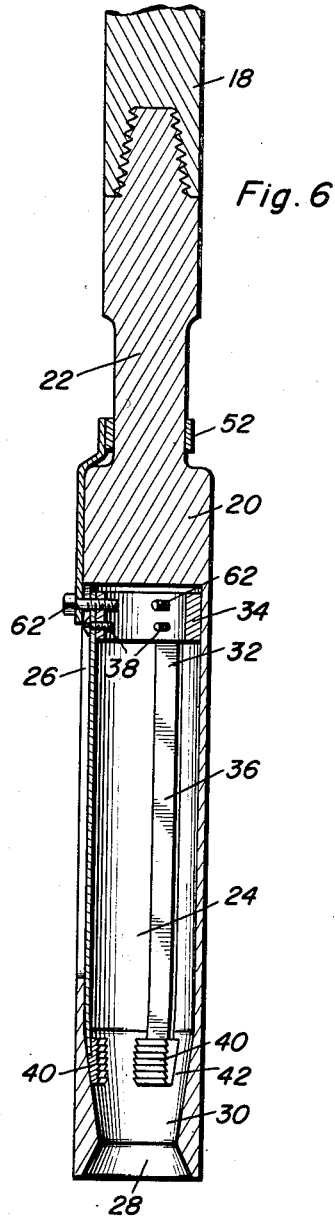
Figure 6 is a view similar to Figure 5 but showing the same tool with the slip socket releasing device of this invention applied thereto, and with the fish withdrawn from the tool.

At their upper ends, the fingers 56 are provided with offset upper terminal portions 58 by means of which they are secured to the arcuate portion of the clamp 52. Angulated portions 60 connect the offset portions 58 with the main portion of the fingers 56, it being seen that when applied to the fishing tool, the releasing device as shown in Figure 6 will have its fingers closely and slidably engaging the exterior surface of the body 20 of the fishing tool, with the clamping portion 52 received upon the neck or stem portion 22 of the fishing tool, and with the angulated portion 60 overlying the shoulder where the main body of the fishing tool merges into the stem portion 22.

At their lower ends, the fingers 56 are provided with screws or other suitable fasteners 62 which are adapted to extend through the slots 26 and are engageable into bores threaded in the ring portion 34 of the slip socket.

The operation and functioning of the releaser is as follows:

After a fish has been captured by the fishing tool and withdrawn from the well bore, as shown in Figure 1, the fishing tool and fish are lowered until the fish 14 rests upon a support board 70 to one side of the well bore or above the same, as desired, the entire weight of the tool thus resting upon the fish 14. This downward pressure tends to move the slip socket upwardly in the chamber 24 of the body of the fishing tool, to the upper end of the same, as shown in Figures 1 and 6. At this time, the upward thrust of the fish against the tool, having moved the latter upwardly in its chamber, has moved the wedging surfaces 42 of the jaws 40 away from the wedging surface 30, whereby the natural resiliency of the fingers 36 will cause the jaws to expand and release the fish. At this time, the clamp of the releasing device is applied to the stem 22 and the fasteners 62 of the fingers of the releasing device are inserted through the slots 26 and engaged into the bores provided for that purpose in the ring member 34 of the slip socket. The fasteners 54 are now clamped, whereby the slip socket is secured in its upward position in the chamber 24 and prevented from downward sliding movement therein. The stem 18 and the fishing tool may then be raised, thus withdrawing the lower portion of the fishing tool chamber from about the stem portion 12 of the fish 14. Thereafter, the slip socket releaser may be removed from the fishing tool and the latter is again ready for its next use in recovering a fish.

It will thus be seen that the use of this clamping device enables the slip socket which would normally move under the influence of gravity downwardly in its chamber 24, and the upper end of the same out of engagement with the fish, whereby the latter is readily removed. If the slip socket releaser were not provided, any attempt to lift the fishing tool would automatically cause the slip socket jaws to again engage upon the fish.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. A slip socket release for a fishing tool of the type having a hollow cylindrical longitudinally slotted body with a supporting shank at its upper end and a fish receiving opening at its lower end, an internally toothed fish engaging slip socket slidable in said body, cooperating wedging surfaces on the body and the socket for compressing the internal teeth upon the fish upon downward movement of the slip socket in the body; said slip socket release comprising a clamp for fixedly embracing the shank of the body, fingers depending from the clamp for embracing the exterior of the body, fasteners carried by the fingers and engageable through slots in the body with said slip socket whereby the latter will be held in a raised position in the body to permit the internal teeth of the slip socket to be disengaged from the fish and the latter to be withdrawn.

2. The combination of claim 1 wherein said clamp embraces said shank for sliding movement thereon and means for fixedly securing said clamp upon the shank in slidably adjusted position.

3. The combination of claim 1 wherein said clamp includes a circular band embracing said shank, said fingers having angularly disposed upper ends.

4. The combination of claim 1 wherein said fasteners engage the upper portion of said slip socket.

5. The combination of claim 1 wherein each fastener is carried by one of said fingers and is engageable through one of the slots of the body.

6. The combination of claim 1 wherein there is provided one finger for each slot, the fasteners extending through the respective slots for their fingers.

No references cited.